US005698052A

United States Patent [19]
Russo et al.

[11] Patent Number: 5,698,052
[45] Date of Patent: Dec. 16, 1997

[54] WALLPAPER ADHESIVE

[75] Inventors: Gerald M. Russo, Oak Park; Kardar M. Majeed, Elk Grove, both of Ill.; Merle L. Houck, Griffith, Ind.; Jack L. Gogek, Glenview, Ill.

[73] Assignee: Roman Adhesives, Inc., Calumet City, Ill.

[21] Appl. No.: 499,208

[22] Filed: Jul. 7, 1995

Related U.S. Application Data

[62] Division of Ser. No. 154,292, Nov. 18, 1993, abandoned.

[51] Int. Cl.$^6$ .................. E04B 2/00; E04F 13/00
[52] U.S. Cl. .................. 156/71; 52/746.1; 156/336
[58] Field of Search .................. 525/54.2, 54.21, 525/54.24; 527/300; 428/350; 106/203, 213; 156/328, 338, 71, 336; 52/746.1

[56] References Cited

U.S. PATENT DOCUMENTS

| | | | |
|---|---|---|---|
| 4,274,884 | 6/1981 | Cartwright | 134/4 |
| 4,705,825 | 11/1987 | Symes et al. | 524/732 |
| 4,814,039 | 3/1989 | Willging | 156/328 |
| 4,816,186 | 3/1989 | Acitelli | 252/610 |
| 5,271,766 | 12/1993 | Koutlakis et al | 106/213 |

*Primary Examiner*—D. S. Nakarani
*Attorney, Agent, or Firm*—Marshall, O'Toole, Gerstein, Murray & Borun

[57] ABSTRACT

A wallpaper adhesive includes a modified carbohydrate (e.g., starches and cellulose) and a polyhydric alcohol (e.g., glycerin and glycols). Optionally, the adhesive can include a glucose (e.g. dextrin and corn syrup). A method of using the polyhydric alcohol in a wallpaper adhesive includes a step of mixing the polycarbohydrate and alcohol together. The wallpaper adhesive provides good flow and spreadability while providing the necessary tack. The open time permits the wallpaper to be applied and the drying characteristics of the adhesive inhibit the ink from being from the paper into the adhesive and curling of edges of the wallpaper.

17 Claims, No Drawings

WALLPAPER ADHESIVE

CROSS REFERENCE TO RELATED APPLICATION

This application is a divisional of U.S. application Ser. No. 08/154,292 filed Nov. 18, 1993, now abandoned.

TECHNICAL FIELD

This invention generally relates to wallpaper adhesive. More particularly, the invention relates to a wallpaper adhesive for wallpaper that is not prepasted with the adhesive having improved flow and spreadability, open time and other desirable properties.

BACKGROUND OF THE INVENTION

People use wallpaper to decorate the interior walls of homes, hotels, offices, hospitals and other structures where people live, work and meet. A typical wall is made from a layer of paper wrapped around a compressed gypsum core. The wallpaper is held to a wall by an adhesive that bonds the wallpaper to the wall. The adhesive can be applied to the wallpaper by the person hanging the wallpaper or it can be applied by the wallpaper manufacturer, i.e., prepasted wallpaper, and rehydrated by the wallpaper hanger prior to hanging. Many characteristics of the adhesive affect both whether the wallpaper can be easily hung and the appearance of the wallpaper after the adhesive has dried.

Typically, the wallpaper has a inked pattern. The pattern often must be matched at the edges of two contiguous sheets of wallpaper. To do this, a pasted sheet of wallpaper is hung on the wall. Then, a second pasted sheet is placed on the wall and slide next to one of the edges of the first sheet, forming a seam. The second sheet is matched by adjusting up or down so that the pattern at the edge of the first sheet aligns with the pattern on the edge of the second sheet resulting in the illusion that the pattern continues from the first to the second sheet. This process of pattern matching continues with each subsequently applied sheet. Even if there is no pattern, the most recently applied sheet still must be adjusted towards the edge of the previously applied sheet to eliminate gaps therebetween which would show the underlying wall and must be able to slide into corners. Often, a sheet must be partially lifted from, and reapplied to, the wall to enable alignment of the pattern or to remove wrinkles in, or bubbles underneath, the wallpaper.

It is important during application of the adhesive to a surface that it flow and spread rapidly and evenly, regardless of whether it is applied at the factory or by the wallpaper hanger, to get an even film of adhesive. Contrary to the characteristics of good flow and spreadability is the requirement that the adhesive be tacky so that it will adhere to the wall while the adhesive is still wet and permit the wallpaper to be adjusted on the wall. The tackiness of the adhesive should permit it to hold the wallpaper to the wall while the wallpaper is being adjusted into position and to permit the wallpaper to be lifted and reapplied to the wall. Unfortunately, many existing adhesives sacrifice flow and spreadability for tack, or vice versa, making the wallpaper more difficult to hang. Such difficulties can frustrate the homeowner who is hanging his/her own wallpaper and can increase the time and cost for the professional wallpaper hanger to complete the job.

Another concern is the stability of the adhesive. The adhesive cannot lose its flow and spreadability prior to the adhesive being applied to the surface. If they are lost, the adhesive is more difficult to apply and, in the case when the wallpaper hanger is applying the adhesive, it can result in increased fatigue, frustration at the inability to apply the adhesive, and waste as the adhesive may have to be discarded.

If the open time is too short, the wallpaper hanger may not have a sufficient time period in which to adjust the wallpaper and remove wrinkles and bubbles. This lack of adequate open time can result in the edges of adjacent wallpaper sheets not being matched or wrinkles or bubbles being present. If the open time is too long, the wallpaper may move under its own weight resulting in misalignment of the pattern, wrinkles or bubbles being formed or the wallpaper falling off of the wall. Too long of an open time can result in the adhesive not setting with the result being that the wallpaper never is secured to the wall and can still be moved after an inordinate length of time.

The open time is the time period from when the adhesive is applied (for wallpaper that is not prepasted) or activated (as by wetting for prepasted wallpaper) to just before the time at which the adhesive will no longer wet the wall and provide a bond.

The hands of the person hanging the wallpaper may come in contact with the adhesive. Many existing adhesives dry the person's hands, making the person uncomfortable.

Problems can also arise during drying of the adhesive. If the adhesive is on the inked surface of a top printed wallpaper, it can damage the ink as the adhesive drys. Adhesive shrinkage that occurs during drying can lift the ink from the wallpaper. As the wallpaper drys, it can shrink, exposing seams between adjacent sheets or causing edges of the sheet to curl. Obviously, any of these results are aesthetically unpleasing.

The adhesive should be easy to clean up from the wallpaper hanger's hands and equipment. Often, this is not the case.

Eventually, a time comes when the old wallpaper has to be removed. Removal must be accomplished without ruining the wall, e.g., without removing the paper of the wallboard or leaving wallpaper on the wall. One way to avoid ruining a wall is to apply a size coating composition which seals the surface of the wall. The adhesive then adheres to the size coating which is strong enough to withstand the removal of the wallpaper and which remains on the wall. Applying a size coating is expensive both in terms of the cost of the size and the time required to apply and wait for it to dry. This additional cost is especially burdensome to the professional wallpaper hanger. The desire to have an adhesive that permits removal of the wallpaper is contrary to the objective of obtaining good adherence of the wallpaper to the wall.

A wallpaper adhesive that overcomes one or more of the aforementioned problems and shortcomings of existing wallpaper adhesive is highly desirable.

SUMMARY OF THE INVENTION

The invention provides a wallpaper adhesive with superior physical properties, including good flow and spreadability, and that facilitates adjusting the wallpaper to match the pattern and remove wrinkles and bubbles. The wallpaper adhesive has a good open time, does not draw ink from the wallpaper and does not shrink to cause curling of the wallpaper edges.

The wallpaper adhesive contains a modified polycarbohydrate, e.g., a starch and cellulose, and a polyhydric alcohol, e.g., glycerin and glycols. Additionally, the wallpaper adhesive can include a glucose, e.g., a dextrin and corn syrup.

The invention is also to a method of making the wallpaper adhesive that includes the steps of combining the modified polycarbohydrate with the alcohol and mixing the combination. The method can include a step of modifying the polycarbohydrate under conditions effective to reduce the molecular chain length of the polycarbohydrate. The method can also include one or more of the following steps: combining a glucose with the polycarbohydrate and alcohol mixture; and applying the adhesive to a surface.

The invention is also to a method of using the polyhydric alcohol in a wallpaper adhesive, a method of using glucose in a wallpaper adhesive and a method of using the modified polycarbohydrate in a wallpaper adhesive.

The wallpaper adhesive provides good flow and spreadability, yet must also have the desired tack. It is highly stable which gives a long shelf life. The open time provides enough time to permit adjustment of the wallpaper on the wall yet the adhesive dries in time to prevent undue shifting. While drying, the adhesive does not lift ink from the surface of the wallpaper, nor does it cause curling of the edges. The adhesive also cleans up easily. The composition of the wallpaper adhesive permits it to be used on a wall, e.g., wallboard, without using a size coating because the dried film of adhesive permits the wallpaper to be removed without harming the wall.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms, there are described in detail herein, presently preferred embodiments of the invention. It should be understood, however, that the present disclosure is to be considered as an exemplification of the principles of this invention and is not intended to limit the invention to the embodiments described.

A wallpaper adhesive including a carbohydrate and a polyhydric alcohol is disclosed. The adhesive can also include a glucose. The wallpaper adhesive can be applied to the wallpaper by the manufacturer to create a prepasted wallpaper or, preferably, is applied by the person hanging the wallpaper. As discussed in more detail below, the wallpaper adhesive has many characteristics that make wallpaper hanging, clean up and wallpaper removal easier.

The polyhydric alcohol is selected to provide improved flow and spreadability yet permit the adhesive to become tacky, especially when the adhesive is not exposed to the shear forces that develop during application of the adhesive to a surface, e.g., the backside of the wallpaper. It is also desirable for the alcohol to contribute to the open time, the stabilization of the adhesive and increase the shelf life thereof.

The term "open time", as used in its various grammatical forms, is the time period from when the adhesive is applied (for wallpaper that is not prepasted) or activated (as by wetting for prepasted wallpaper) to just before the time at which the adhesive will no longer wet the wall and provide a bond.

Representative of the polyhydric alcohol are those having two to three hydroxyl groups and less than about four carbon atoms in each repeating group. Preferred alcohols include glycerin and glycols (e.g., polyethylene glycol, ethylene glycol, propylene glycol and the like). Glycerin is most preferred.

The polycarbohydrate is modified to reduce its molecular chain length and hence its molecular weight. Modification can be accomplished by acetylation, chlorination, acid hydrolysis or enzymatic action. The preferred method is acid hydrolysis. Representative acids are hydrochloric acid and nitric acid. Further modification of the polycarbohydrate is preferably accomplished by mixing the polycarbohydrate suspended in water with the acid at an elevated temperature for a time period to reduce the molecular size. Preferably, the modification is accomplished using hydrochloric acid (37%) in a weight ratio of acid to starch in a range of about 1:300 to about 1:400 and at a temperature in the range of about 140° to about 180° F. for a time period in the range of about 5 to about 30 minutes.

The modified polycarbohydrate can be a starch or cellulose. Preferably, the polycarbohydrate is premodified prior to further modification. Preferably, the polycarbohydrate is a starch. The starch can come from many sources including corn, potato, tapioca, wheat, sago, rice and the like. Corn starch is preferred. A preferred acid modified starch is one having a fluidity in the range of 60±10 based on the American Maize Fluidity Test. Representative starches include those from the Amaizo 300 starch group, (e.g., Amaizo 350) commercially available from Amaizo).

The glucose is preferably a dextrin (e.g., maltodextrin, white dextrin, yellow dextrin and the like), corn syrup (which includes corn syrup solids) or the like. Most preferred is a maltodextrin. The dextrin preferably has a dextrose equivalent in the range of about 10 to about 25. A commercially available maltodextrin is Lo-Dex 15 from American Maize-Products Co., Hammond, Ind. Low-Dex 15 has a dextrose equivalent of about 18.

The composition can also include a base to neutralize the acid (e.g., sodium bicarbonate, sodium carbonate, sodium hydroxide, potassium hydroxide, ammonium hydroxide and the like), a whitener to whiten the adhesive and prevent staining of the wallpaper (e.g., hydrogen peroxide), a neutralizer of the whitener (e.g., sodium metabisulfite and sodium bisulfite), sodium nitrate, bactericides and fungicides. The adhesive also includes water that can be used to adjust the viscosity of the adhesive.

The weight ratio of alcohol to polycarbohydrate is in the range of about 1:2 to about 1:3.5. The weight ratio of the glucose to polycarbohydrate is in the range of 1:1 to about 1:3. Most preferably, the weight ratio of alcohol to glucose to polycarbohydrate is in the range of about 1:1:2 to about 1:2:3.

The adhesive can be a concentrate to which additional water is added at the site where it is to be used or it can be provided at the proper strength. Typically, the Brookfield viscosity of the adhesive when it is to be applied by the paper hanger is in the range of about 20,000 to 40,000 centipoise (cps). When the adhesive is used to prepaste wallpaper, the viscosity can be adapted to the process.

The viscosity profile is disclosed in TABLE I, below.

TABLE I

| VISCOSITY PROFILE FOR WALLPAPER ADHESIVE | |
|---|---|
| REVOLUTIONS PER MINUTE | VISCOSITY (CPS) |
| 2 | 11,500 |
| 4 | 14,000 |
| 10 | 19,000 |
| 20 | 23,500 |

The viscosity profile is determined by a Brookfield viscometer at 75° F. and a TC spindle. The Brookfield viscosity when measured at a temperature of 75° F. prior to the adhesive being let down with water is in the range of about 30,000 to about 40,000 cps. The modification of the polycarbohydrate can be adjusted to obtain the desired viscosity.

The pH of the adhesive is preferably in the range of about 7.5 to 8.0.

When the wallpaper is ready to be applied to the wall, the adhesive has a tack time in the range of about 5 to 15 minutes.

In the process of making the wallpaper adhesive, it is preferred to add the alcohol and the glucose after modification of the polycarbohydrate so that they are not affected by the acid or the elevated temperature. Introduction at this time also reduces the amount of mixing to which they are subjected. It is preferred to add an aliquot of at least one of the alcohol and glucose followed by mixing and then addition of the remainder to reduce clumping and to obtain a smoother adhesive. The mixing of the components of the adhesive preferably occurs at a temperature in the range of about 120° to about 130° F.

The adhesive is applied as film to a surface, e.g., the backside of the wallpaper or the wall. When dried, the film holds the wallpaper in position. The wallpaper can be removed without harming the wall, even if the wall has not been sized, because of partial weakening of the adhesive effect of the dried layer due, it is presently theorized, to the glucose.

The invention is also to a method of using a polyhydric alcohol in a wallpaper adhesive and includes the step of combining the polycarbohydrate and the alcohol and mixing the polycarbohydrate and alcohol. The method can also include the step of applying the adhesive to a surface.

The invention is also to a method of using glucose in a wallpaper adhesive having other components, e.g., the polycarbohydrate, the alcohol and the like. The method includes the steps of combining the glucose with at least one of the components and producing a glucose-containing wallpaper adhesive.

The invention is also to a method of using a modified starch in a wallpaper adhesive that includes the steps of mixing a starch and acid, heating them under conditions effective to reduce the molecular weight of the starch and producing a modified starch-containing wallpaper adhesive.

The following example is given by way of illustration, and not limitation.

EXAMPLE: WALLPAPER ADHESIVE

A wallpaper adhesive representative of the present invention was prepared using the components of the following TABLE II.

TABLE II

| COMPONENTS OF THE WALLPAPER Adhesive | |
|---|---|
| Component | Weight (LBS) |
| Water | 10,344 |
| Starch 350[1] | 3,015 |
| Hydrochloric Acid - 37% | 8.5 |
| Sodium Bicarbonate | 50 |
| Glycerin (96%) | 746 |
| Water | 923 |
| Hydrogen Peroxide (35%) | 32 |
| Sodium Metabisulfite | 20 |
| Sodium Nitrate | 13 |
| Maltodextrin[2] | 1,100 |
| Glycerin (96%) | 365 |
| Water | 3,331 |
| Maltodextrin[2] | 600 |
| Bactericide[3] | 65 |
| Fungicide[4] | 12.5 |

[1] Amaizo 350 which is an acid modified common corn starch, commercially available from Amaizo.
[2] Lo-Dex 15, a maltodextrin commercially available from American Maize Products Co., Hammond, Indiana.
[3] Amerstat 252, commercially available from Drew Industrial Division, Boonton, New Jersey.
[4] Skane M-8

The components are mixed in a conventional mixer such as a paddle blade mixer. The first aliquot of water (10,344 lbs) is introduced into the mixer and agitation is started. The starch is then introduced into the mixer. The second aliquot of water (31 lbs) has the hydrochloric acid introduced thereto with the resulting mixture being introduced into the mixer. After ten minutes of mixing, the agitation is stopped to obtain a sample to determine the pH. When the pH is in the range of about 2 to about 2.5 agitation is restarted and the contents of the mixture are heated to about 158° F., the heat is turned off and after a fifteen minute hold at that temperature, the contents of the mixer are permitted to cool. When the contents have reached a temperature of 130° F., the sodium bicarbonate is introduced into the mixer. The contents are mixed at a temperature of about 130° F. for a time period of about ten minutes prior to the introduction of an aliquot of the glycerin into the mixer. The third aliquot of water (923 lbs) is introduced into the mixer. After about ten minutes of mixing, the hydrogen peroxide and the sodium metabisulfite are introduced into the mixer. After a time period of about twenty minutes, residual peroxide is neutralized with sodium metabisulfite and then the sodium nitrate is added. After an additional ten minutes of mixing, an aliquot of the dextrin is very slowly introduced into the mixer. Then, the fourth aliquot of water (3331 lbs) is introduced into the mixer. The remaining aliquot of the dextrin is then very slowly introduced. The heating is turned off and the cooling started. When the temperature is reduced to about 120° F., the bactericide and fungicide are introduced with mixing.

The Brookfield viscosity when measured at a temperature of about 75° F. after the adhesive is let down with additional water is about 14,000 to about 16,000 cps. The pH is in the range of about 7.5 to 8.

The wallpaper adhesive has excellent flow and spreadability which makes it easy to apply an even film. The adhesive is stable which provides a long shelf life and helps maintain the flow and spreadability so that the paper hanger has an adequate time period in which to use the adhesive. The adhesive on a surface has the desirable tack so that it will adhere the wallpaper to the wall. The open time of the adhesive is such that a sheet of wallpaper can be applied to the wall and adjusted to align a pattern on the sheet with the pattern on an adjacent sheet that is already on the wall and to remove wrinkles and bubbles from the wallpaper. The adhesive will then dry and set to form a dried film that prevents the wallpaper from shifting or falling off of the wall. While drying on the surface of the wallpaper, the adhesive does not draw the ink from the wallpaper. Also, the adhesive does not shrink while drying which inhibits curling of the edges of the wallpaper. The hands of the paper hanger are not dried out due to contact with the adhesive and the adhesive cleans up readily. When it comes time to remove the wallpaper, the dried film fractures permitting the wallpaper to be removed without damaging the wall. Thus, the surface of the wall does not have to be sized prior to wallpapering which saves time and money.

It is presently theorized that the above-described advantages are achieved because of the unique composition of the adhesive. It is theorized that the alcohol contributes to the flow and spreadability and the tackiness and increases the stability and the open time of the adhesive. During drying, it is theorized that the adhesive exhibits a low shrinkage rate and surface tension which inhibits drawing of the ink and curling of the edges of the wallpaper. The alcohol is also theorized to help inhibit drying of the paper hangers hands.

It is presently theorized that the glucose also contributes to the tack and stability of the adhesive. Furthermore, it is presently theorized that the glucose has poor cohesion with the wall and when interspersed throughout the dried film results in selective areas of reduced adhesion, i.e., a discontinuous dried film, which permits the dried film to fracture when it is desired to remove the wallpaper.

This wallpaper adhesive is particularly well suited for wallpaper to which the paper hanger applies the adhesive and contributes to the efficiency of the wallpaper hanger.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A method of securing wallpaper to a wall consisting essentially of coating one side of the wallpaper or the wall with an aqueous wallpaper adhesive comprising:

a modified polycarbohydrate having a fluidity in the range of 50 to 70, when measured according to the American Maize Fluidity Test, selected from the group consisting of starch and cellulose; and a polyhydric alcohol;

and pressing one side of the wallpaper against the wall, with said aqueous wallpaper adhesive therebetween, wherein the aqueous wallpaper adhesive has a weight ratio of polyhydric alcohol to modified polycarbohydrate in the range of about 1:2 to about 1:3.5.

2. The method of claim 1, wherein the wallpaper adhesive has a Brookfield viscosity in the range of about 14,000 centipoises to about 16,000 centipoises at 75° F.

3. The method of claim 1, wherein the polyhydric alcohol is selected from the group consisting of glycerin and glycols.

4. The method of claim 1, wherein the modified polycarbohydrate is polycarbohydrate modified by exposure to hydrochloric or nitric acid at a temperature in the range of about 140° to about 180° F. for a time period in the range of about 5 to about 30 minutes.

5. The method of claim 1, wherein the wallpaper adhesive further comprises a glucose.

6. The method of claim 5, wherein the glucose is selected from the group consisting of dextrin and corn syrup.

7. The method of claim 5, wherein the weight ratio of polyhydric alcohol to glucose to modified polycarbohydrate is in the range of about 1:1:2 to about 1:2:3.

8. The method of claim 1, wherein the modified polycarbohydrate is the acid modified starch.

9. The method of claim 3, wherein the polyhydric alcohol is glycerin.

10. The method of claim 9, wherein the wallpaper adhesive further includes dextrin and the wallpaper adhesive, after drying, is discontinuous on said wall, and wherein the modified polycarbohydrate is present in the wallpaper adhesive in an amount greater than any other component of the wallpaper adhesive, expect for water.

11. A method of securing wallpaper to a wall consisting essentially of coating one side of the wallpaper or the wall with an aqueous wallpaper adhesive comprising water, a polyhydric alcohol and a modified polycarbohydrate having a fluidity in the range of 50 to 70, when measured according to the American Maize Fluidity Test, in a weight ratio of polyhydric alcohol to modified polycarbohydrate in the range of 1:2 to 1:3.5, and pressing one side of the wallpaper against the wall, with said aqueous composition therebetween.

12. The method of claim 11, wherein the wallpaper adhesive has a Brookfield viscosity in the range of about 14,000 centipoises to about 16,000 centipoises at 75° F.

13. The method of claim 11, wherein the polyhydric alcohol is selected from the group consisting of glycerin and glycols.

14. The method of claim 11, wherein modified polycarbohydrate is starch modified by exposure to hydrochloric or nitric acid at a temperature in the range of about 140° to about 180° F. for a time period in the range of about 5 to 30 minutes.

15. The method of claim 14, wherein the wallpaper adhesive further includes dextrin and the wallpaper adhesive, after drying, is discontinuous on said wall, and wherein the modified starch is present in the wallpaper adhesive in an amount greater than any other component, except water.

16. The method of claim 11, wherein the modified polycarbohydrate is the acid modified starch.

17. The method of claim 13, wherein the polyhydric alcohol is glycerin.

* * * * *